US008407882B2

(12) United States Patent
Seki et al.

(10) Patent No.: US 8,407,882 B2
(45) Date of Patent: Apr. 2, 2013

(54) METHOD FOR MANUFACTURING THIN FILM MAGNETIC HEADS

(75) Inventors: Takateru Seki, Kanagawa-ken (JP);
Zhou Wenjun, Kanagawa-ken (JP);
Kazuo Takeda, Kanagawa-ken (JP);
Takefumi Kubota, Kanagawa-ken (JP)

(73) Assignee: HGST Netherlands B.V., Amsterdam (NL)

(*) Notice: Subject to any disclaimer, the term of this patent is extended or adjusted under 35 U.S.C. 154(b) by 525 days.

(21) Appl. No.: 12/559,327

(22) Filed: Sep. 14, 2009

(65) Prior Publication Data
US 2010/0077600 A1    Apr. 1, 2010

(30) Foreign Application Priority Data
Sep. 26, 2008  (JP) ................................. 2008-247988

(51) Int. Cl.
*G11B 5/127* (2006.01)
*H04R 31/00* (2006.01)

(52) U.S. Cl. ............... 29/603.16; 29/603.12; 29/603.13; 29/603.14; 29/603.15; 29/603.18; 451/5; 451/8; 451/10; 451/36; 451/37; 360/121; 360/122; 360/317

(58) Field of Classification Search ............... 29/603.12, 29/603.13–603.16, 603.18; 451/5, 8, 10, 451/36, 37, 41
See application file for complete search history.

(56) References Cited

U.S. PATENT DOCUMENTS

| 4,914,868 | A  | * | 4/1990  | Church et al. ..................... 451/5 |
| 6,532,646 | B2 | * | 3/2003  | Watanuki ................... 29/603.12 |
| 6,599,170 | B2 | * | 7/2003  | Sone et al. ......................... 451/5 |
| 6,884,148 | B1 | * | 4/2005  | Dovek et al. ....................... 451/5 |
| 6,913,509 | B2 | * | 7/2005  | Sone et al. ......................... 451/5 |
| 7,149,061 | B2 |   | 12/2006 | Yamakura et al. ............ 360/316 |
| 7,681,303 | B2 | * | 3/2010  | Kondo et al. .............. 29/603.12 |
| 7,716,811 | B2 | * | 5/2010  | Seki et al. .................... 29/603.1 |

FOREIGN PATENT DOCUMENTS

| JP | 2001/101634 | 4/2001 |
| JP | 2006/344381 | 12/2006 |

* cited by examiner

*Primary Examiner* — Paul D Kim

(74) *Attorney, Agent, or Firm* — Zilka-Kotab, PC

(57) ABSTRACT

According to one embodiment, a method for manufacturing a thin film magnetic head includes forming on a substrate magnetic head portions having a magnetoresistive element and resistance detection elements for measuring an amount of polishing; slicing the substrate to form at least one row bar; polishing the ABS of each row bar; forming rails on the polished ABS; and cutting each row bar to separate each magnetic head portion. The step of polishing the ABS includes measuring a resistance of each resistance detection element and a resistance of each magnetoresistive element; calculating an offset value between the resistance detection element and the magnetoresistive element; and calculating a final resistance of the resistance detection element by using the calculated offset value. When the resistance of the resistance detection element reaches the final resistance, polishing of the ABS of the row bar is terminated. Other methods are presented as well.

18 Claims, 13 Drawing Sheets

Fig. 12
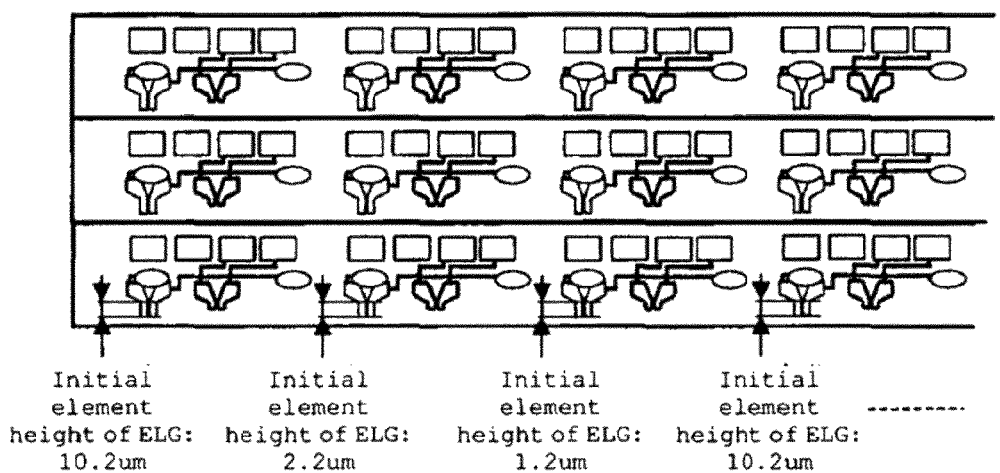
| Initial | Initial | Initial | Initial |
| element | element | element | element |
| height of ELG: | height of ELG: | height of ELG: | height of ELG: |
| 10.2um | 2.2um | 1.2um | 10.2um |
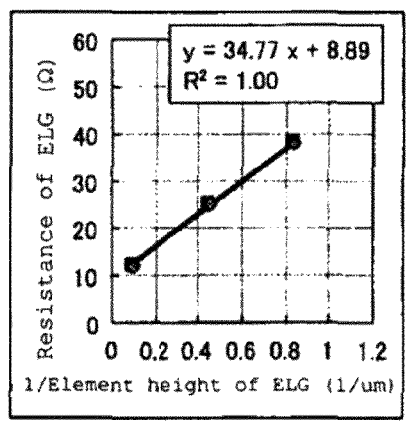
Resistance of ELG =
    a/Element height of ELG + b,
Coefficients a and b are calculated by measuring the resistance of ELGs having three different element heights in the wafer state.
a = 34.77
b = 8.89

METHOD FOR MANUFACTURING THIN FILM MAGNETIC HEADS

RELATED APPLICATIONS

The present application claims priority from a Japanese Pat. Appl. filed Sep. 26, 2008 under Appl. No. 2008-247988, which Is incorporated herein by reference.

FIELD OF THE INVENTION

The present invention relates to a method for manufacturing a thin film magnetic head provided with a magnetoresistive element having a CPP structure.

BACKGROUND OF THE INVENTION

Recent years have seen a rapid increase in the recording density of magnetic read/write devices with increasing amounts of information handled. According to this trend, a magnetic head having high sensitivity and high read output is demanded. In order to meet this demand, a magnetic head utilizing a Giant Magnetoresistive (GMR) element providing high read output has been developed. Further, a magnetic head utilizing a Tunneling Magnetoresistive (TMR) element or a CPP-GMR element is currently being developed. Each element has the Current Perpendicular to the Plane (CPP) structure with which a current is sent so as to pass through a stacking surface of a magnetoresistive film to obtain higher read output.

In order to cope with the increase in the recording density of magnetic read/write devices, it is necessary to decrease the size of a read element such as a TMR element, a CPP-GMR element, etc., and accordingly to decrease the element height and the track width. In particular, in order to prevent variation in element height which causes read output fluctuations, high-accuracy polishing of the air bearing surface may be performed.

Japanese Pat. Appl. No. JP-A-2001-101634 discloses a method for controlling the amount of polishing while monitoring the electrical resistance of a dummy resistive layer embedded in the polishing surface of a row bar having a plurality of magnetic head sliders thereon. This method utilizes the characteristics of the dummy resistive layer that its resistance changes as polishing progresses.

Japanese Pat. Appl. No. JP-A-2006-344381 discloses a method for controlling polishing, comprising the steps of performing finish polishing of the air bearing surface in slider form, detecting in process the resistance of resistance detection elements formed in a slider, and stopping polishing when the detected resistance or an element height converted therefrom reaches a predetermined value.

SUMMARY OF THE INVENTION

According to one embodiment, a method for manufacturing a thin film magnetic head includes forming, on a substrate, a plurality of magnetic head portions, each magnetic head portion having a magnetoresistive element and at least one resistance detection, element for measuring an amount of polishing, slicing the substrate to form at least one row bar, polishing an air bearing surface of the at least one row bar, forming rails on the polished air bearing surface, and cutting the at least one row bar to separate each of the plurality of magnetic head portions. The polishing the air bearing surface of the at least one row bar further includes; measuring a resistance of each of the plurality of resistance detection elements and a resistance of each magnetoresistive element, calculating an offset value between the resistance of each of the plurality of detection elements and the resistance of each of the magnetoresistive elements from the measured resistance of each of the plurality of resistance detection elements and the measured resistance of each magnetoresistive element, and calculating a final resistance of the resistance detection element by using the calculated offset value. When the resistance of the resistance detection element reaches the final resistance, polishing of the air bearing surface of the at least one row bar is terminated.

In another embodiment, a method for manufacturing a thin film magnetic head comprises forming, on a substrate, a plurality of magnetic head portions, each magnetic head portion having a magnetoresistive element and a plurality of resistance detection elements for measuring an amount of polishing, slicing the substrate to form at least one row bar, polishing a surface which perpendicularly intersects with a surface of the at least one row bar having magnetic head portions formed thereon, forming rails on the polished surface, and cutting the at least one row bar to separate each of the plurality of magnetic head portions. The polishing the surface which perpendicularly intersects with a surface of the at least one row bar having magnetic head portions formed thereon further includes: measuring a resistance of each of the plurality of resistance detection elements and a resistance of each magnetoresistive element, calculating an offset value between the resistance of each of the plurality of detection elements and the resistance of each of the magnetoresistive elements from the measured resistance of each of the plurality of resistance detection elements and the measured resistance of each magnetoresistive element, and calculating a final resistance of the resistance detection element by using the calculated offset value. When the resistance of the resistance detection element reaches the final resistance, polishing of the air bearing surface of the at least one row bar is terminated.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 12 shows variation in initial element height of ELGs on a substrate (wafer).

DETAILED DESCRIPTION

Figure 1:
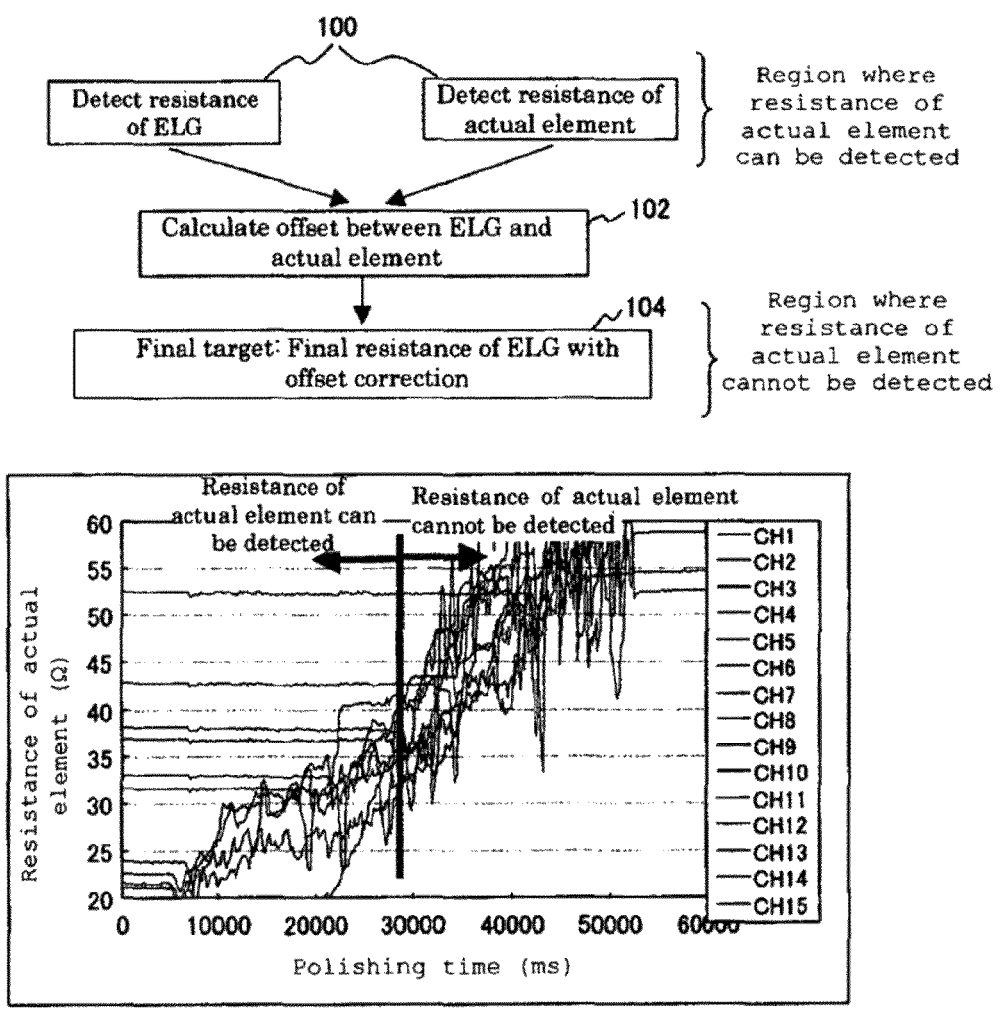
FIG. 1 shows processing for correcting the offset between an ELG and an actual element, and determining the final resistance of the ELG in a method for manufacturing a thin film magnetic head according to an embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

With TMR and CPP-GMR elements, a plastic flow of metallic elements constituting a magnetic shield film or a magnetic domain control layer causes smear while the air bearing surface is being polished, and smear noise makes it difficult to measure the resistance of an actual element (magnetoresistive element). Therefore, as described in Jap. Pat. Appl. Nos. JP-A-2001-101634 and JP-A-2006-344381, it is effective to measure the resistance of an Electronic Lapping Guide (ELG) such as a dummy resistive layer, a resistance detection element, etc., provided on the row bar or slider to control the amount of polishing. However, with the decrease in size of the read element, it becomes difficult to ignore variation in offset between the ELG and the actual element (magnetoresistive element) on a substrate, forming a bottleneck for increasing the accuracy of the element height. Variation in offset between the ELG and the actual element is caused by a formation error of an exposure mask, used for forming magnetoresistive elements and ELGs on a substrate, and an exposure error in the exposure process.

With the decrease in size of a magnetoresistive element having the CPP structure, it becomes difficult to ignore variation in offset between the ELG (resistance detection element) and the actual element (magnetoresistive element) on a substrate, forming a bottleneck for increasing the accuracy of MR element height.

In order to solve this problem, the resistance of the ELG and the resistance of the actual element are detected (measured) in a region where the resistance of actual elements can be detected in the step of finally polishing the air bearing surface of a row bar. Then, the offset between the ELG and the actual element is calculated from the resistance of the ELG and the resistance of the actual element detected. Then, the final resistance of the ELG to be used as a target value for stopping polishing is corrected by using the calculated offset value, and the final resistance is recognized as the final target value. Then, when the resistance of the ELG reaches the final resistance, polishing of the air bearing surface of the row bar is stopped.

One object of the present invention is to provide a method for manufacturing a thin film magnetic head, the method making it possible to determine with high accuracy the element height of magnetoresistive elements having the CPP structure.

In order to attain the above-mentioned object, a method for manufacturing a thin film magnetic head according to one embodiment comprises the steps of: forming on a substrate magnetic head elements having a magnetoresistive element and resistance detection elements for measuring the amount of polishing; slicing the substrate to form each row bar; polishing the air bearing surface of the row bar; forming rails on the polished air bearing surface; and cutting the row bar to form each magnetic head element; wherein the step of polishing the air bearing surface of the row bar includes the substeps of: measuring the resistance of each resistance detection element and the resistance of each magnetoresistive element; calculating the offset between the resistance detection element and the magnetoresistive element from the measured resistance of the resistance detection element and the measured resistance of the magnetoresistive element; and calculating the final resistance of the resistance detection element by using the calculated offset value, wherein when the resistance of the resistance detection elements reaches the final resistance, polishing of the air bearing surface of the row bar is completed.

The method according to one embodiment, performs the step of calculating the offset between the resistance detection element and the magnetoresistive element in a polishing stage where the resistance of the magnetoresistive element can be measured.

The polishing stage where the resistance of the magnetoresistive element can be measured refers to a polishing stage where the measured resistance of the magnetoresistive element is low.

When the polishing stage is divided into initial, middle, and last substages, the polishing stage where the resistance of the magnetoresistive element can be measured refers to the initial substage.

The method according to one embodiment performs the step of measuring the resistance of each resistance detection element and the resistance of each magnetoresistive element in a region where the difference between the resistance envelope and the resistance of magnetoresistive elements is small.

The step of polishing the air bearing surface of the row bar includes a first polishing substep of approximating the element height of the magnetoresistive element to a predetermined value, and a second polishing substep of achieving a predetermined element height of the magnetoresistive element and finishing the surface roughness of the surface to be polished to a predetermined value.

The magnetoresistive element may be a Tunneling Magnetoresistive (TMR) element or a CPP-GMR element.

The air bearing surface of the row bar is a surface which perpendicularly intersects with the surface having a magnetic head element formed thereon.

According to one embodiment, there is provided a method for manufacturing a thin film magnetic head, the method making it possible to determine with high accuracy the element height of magnetoresistive elements having the CPP structure.

Figure 7:
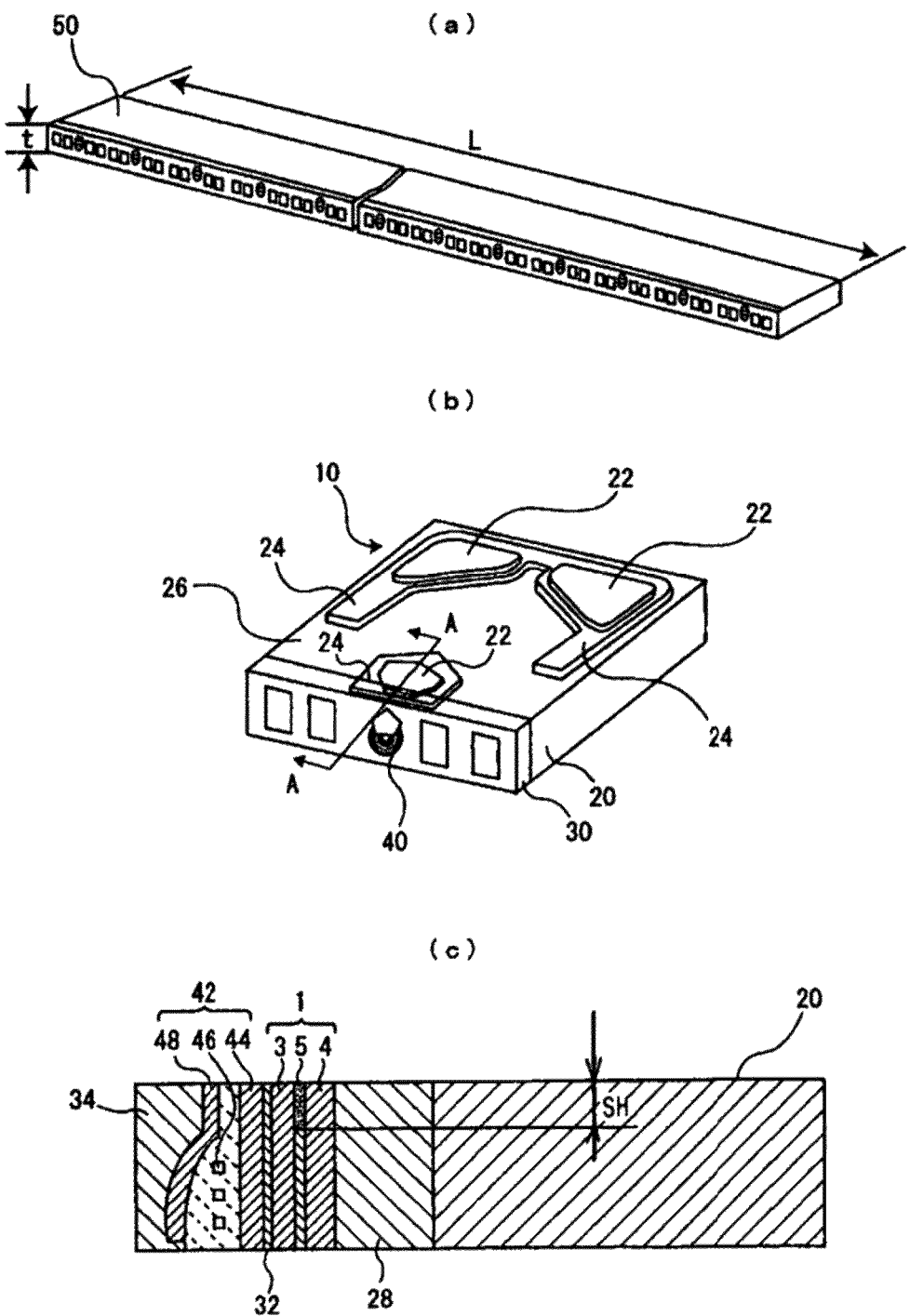
FIG. 7(a) is a perspective view showing a row bar according to one embodiment.
FIG. 7(b) shows a perspective view showing a thin film magnetic head according to one embodiment.
FIG. 7(c) shows a cross-sectional view of a magnetic head element according to the present invention.

The configuration of a thin film magnetic head according to the present invention, will be explained below with reference to FIG. 7. FIG. 7(a) is a perspective view of a row bar sliced out from a substrate (wafer). FIG. 7(b) is a perspective view of a thin film magnetic head produced by cutting the row bar, and FIG. 7(c) a cross-sectional view taken along the A-A line of FIG. 7(b). A row bar 50 is a concatenation of about 45 thin film magnetic heads, and is about 50 mm long (L) and about 0.3 mm thick (t). A thin film magnetic head 10 includes a slider 20 and an element formation portion 30 having a magnetic head element 40 formed therein. Air bearing rails 22, shallow groove rails 24, and a deep groove 26 are formed on the air bearing surface of the thin film magnetic head 10. As shown in FIG. 7(c), the magnetic head element 40 is formed at an end face of the slider 20 made of a ceramic material through an insulating film 28. The magnetic head element 40 is composed of a read element 1 and a write element 42 which are stacked in layers. The read element 1, a magnetoresistive element having the CPP structure, is composed of a lower magnetic shield and electrode layer 4, a magnetoresistive film 5 such as a TMR film, a CPP-GMR film, etc, and an upper magnetic shield and electrode layer 3. The length SH from the air bearing surface of the magnetoresistive film 5 toward the depth direction is the element height (hereinafter referred to as MR element height). The write element 42 is an inductive type element stacked on a separation film 32 formed on the upper magnetic shield and electrode layer 3. The write element 42 is composed of a lower magnetic layer 44, a coil 46, and an upper magnetic layer 48. The upper part of the write element 42 is covered by a protective layer 34. In FIG. 7(b), ELG elements and lead terminals to be mentioned later are omitted.

Figure 8:
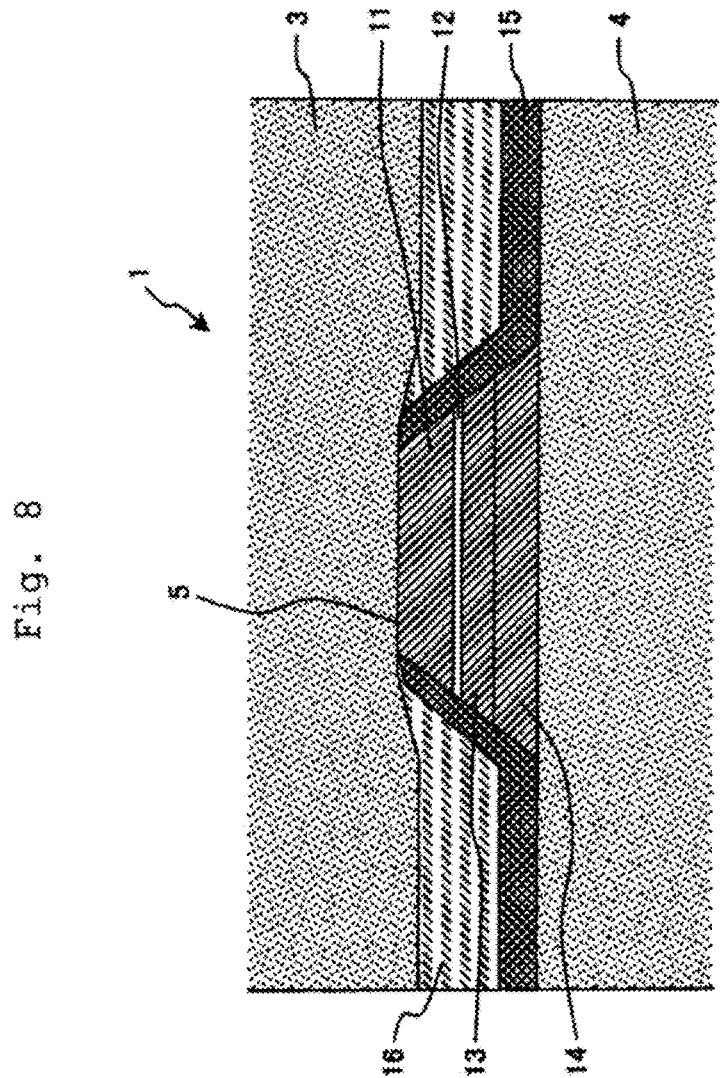
FIG. 8 is a cross-sectional view of a magnetoresistive element having the CPP structure when viewed from the side of its air bearing surface.

FIG. 8 shows the laminar configuration of a magnetoresistive element having the CPP structure, according to one embodiment. FIG. 8 is a cross-sectional view of the magnetoresistive element when viewed from the side of the air bearing surface. A magnetoresistive element 1 having the CPP structure is composed of the magnetoresistive film 5 comprising a free layer 11 and a pinned layer 13 made of an alloy containing a ferromagnetic material, an anriferromagnetic layer 14 for fixing the pinned layer 13 in the magnetization direction, and an intermediate layer 12 made of a nonmagnetic material disposed between the free layer 11 and the pinned layer 13; the upper magnetic shield and electrode layer 3 and the lower magnetic shield and electrode layer 4 respectively disposed above and below the magnetoresistive film 5; refill insulating films 15 for electrically insulating these electrodes; and magnetic domain control layers 16 for controlling the magnetization direction of the free layer 11 through the refill insulating films 15.

The free layer 11 changes its magnetization direction by the magnetization direction input from magnetization information recorded on a recording medium. When the magnetization direction of the free layer 11 changes, the resistance of a magnetic sensor changes by the difference between the magnetization directions of the free layer 11 and the pinned layer 13. A hard disk drive converts such resistance changes to an electric signal to read information. Therefore, in order to read resistance changes of the magnetic sensor, a current is sent between the upper magnetic shield and electrode layer 3 and the lower magnetic shield and electrode layer 4.

The magnetic domain control layers 16 are disposed as close to an end face of the free layer 11 as possible so that a bias magnetic field is applied to the free layer 11, according to one embodiment. Although the magnetization direction of the free layer 11 changes by sensitively reacting to a feeble recording magnetic field of information recorded on the recording medium, it is necessary to apply a bias magnetic field to ensure the reproducibility and stability of the initial magnetization state and the magnetization state changed when the recording magnetic field is input. Specifically, the free layer 11 receives the recording magnetic field input from the magnetic recording medium and performs magnetization rotation. Therefore, if the free layer 11 has a magnetic domain without single magnetic domain formation, movement of a magnetic wail occurs when the recording magnetic field is input. This movement may not only cause various noises such as the Barkhausen noise but also degrade the reproducibility of the initial magnetization state and the magnetization state at the time of magnetization, resulting in output fluctuations or the like and degradation of the output read signal. A bias magnetic field is applied to the free layer 11 in order to form a single magnetic domain in the free layer 11.

The antiferromagnetic layer 14 utilizes an antiferromagnetic film such as a Pt—Mn system alloy, a MnIr system alloy, etc., or a hard magnetic film such as a Co—Pt system alloy, a Co—Cr—Pt system alloy, etc., according to one embodiment. An antiparallel-coupled high-coercivity film, so-called a self-pin, may be used as the hard magnetic film. A Ni—Fe system alloy, a Co—Fe system alloy, a Co—Ni—Fe system alloy, magnetite, Heusler alloy, and other high polarization materials, and a film stack of these materials can be used as the free layer 11 and the pinned layer 13. Further, a multilayer film including ferromagnetic layers through a spacer layer with a thickness of 1 nm or below can also be used. When a TMR film is used, the intermediate layer 12 is a tunnel barrier layer. Specifically, the intermediate layer 12 is composed of Al, Mg, Si, Zr and Ti, an oxide of a mixture thereof, or a stack of oxides thereof. When a CPP-GMR film is used, the intermediate layer 12 is a conductive layer or a conductive layer having a current restriction layer. Specifically, the intermediate layer 12 is composed of Al, Co, Ag, Au, a mixture thereof, or a stack, thereof. Further, it is also possible to form a current restriction layer by partially oxidizing or nitriding the mixture or stack. A Ni—Fe system alloy is used as the lower magnetic shield and electrode layer 4 and the upper magnetic shield and electrode layer 3. An insulating material such, as $Al_2O_3$ is used as the refill insulating films 15. A hard magnetic film such as a Co—Pt system alloy, a Co—Cr—Pt system alloy, etc., may be used as the magnetic domain control layers 16.

The laminar structure of the magnetoresistive film 5 is not limited to the above-mentioned example but can be formed, for example, by stacking a free layer, an intermediate layer, a pinned layer, an anriferromagnetic layer, and the upper magnetic shield and electrode layer 3 in this order onto the lower magnetic shield and electrode layer 4.

Figure 9:
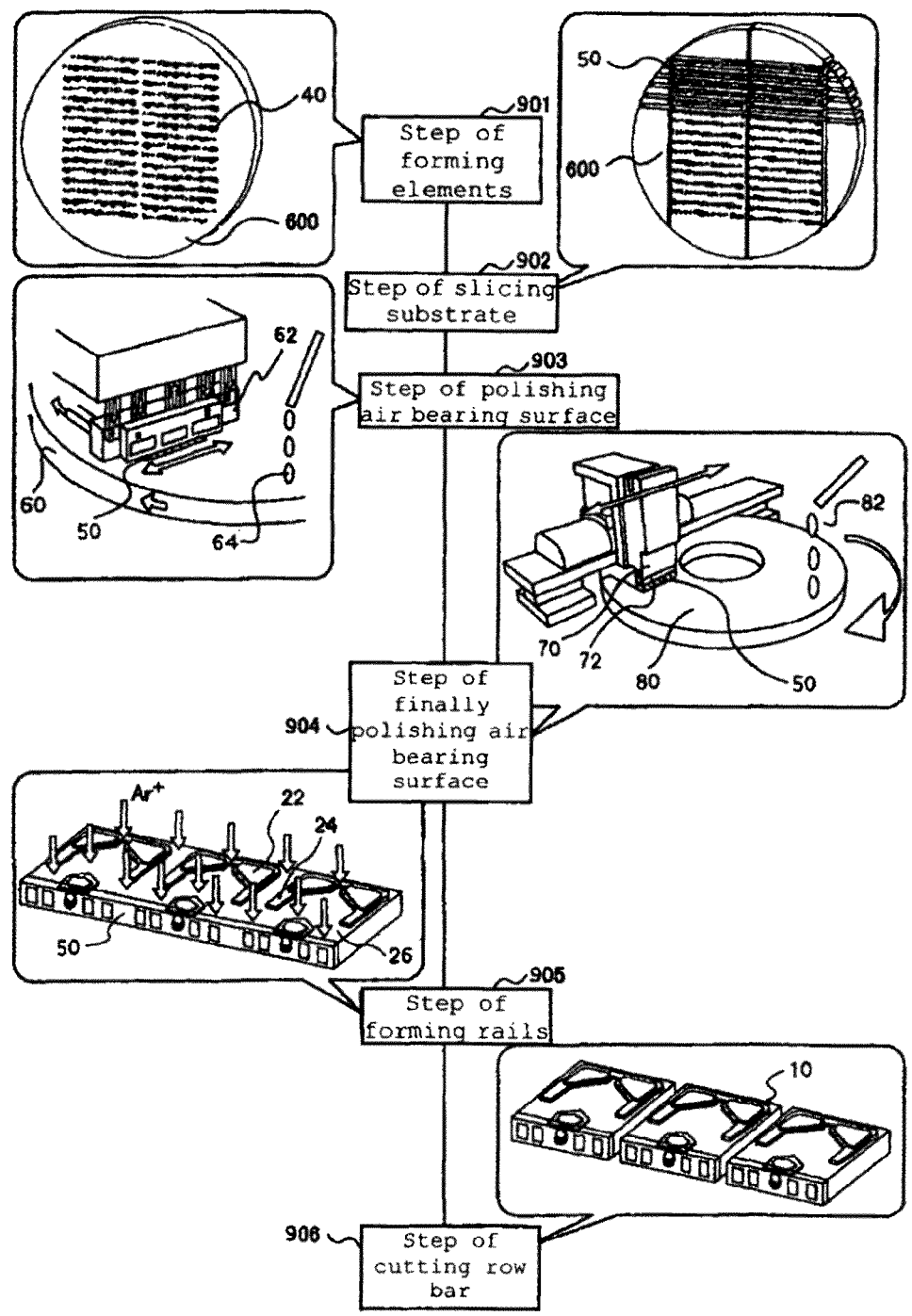
FIG. 9 is a flowchart showing a method for manufacturing a thin film magnetic head according to an embodiment.

A method for manufacturing a thin film magnetic head according to one embodiment may be explained, with reference to the accompanying drawings. FIG. 9 is a flowchart showing a method for manufacturing a thin film magnetic head according to one embodiment. In Step 901 (step of forming elements) of FIG. 9, the $Al_2O_3$ insulating film 28, the lower magnetic shield and electrode layer 4, the magnetoresistive film 5, the upper magnetic shield and electrode layer 3, the $Al_2O_3$ separation film 32, the lower magnetic film 44, the coil 46, the upper magnetic film 48, and the $Al_2O_3$ protective layer 34 are stacked on a ceramic substrate (wafer) 600 made of an AlTiC material ($Al_2O_3$—TiC), etc., as was shown in FIG. 7(c), by using thin film forming technology such as sputtering and lithography process to form the magnetic head elements 40.

In Step 902 (step of slicing a substrate), the wafer 600 is sliced out at each line by using cutting technology such as a grinding wheel, a wire saw, etc., to form blocks 50 called row bars, each being a concatenation of a plurality of thin film magnetic heads 10. In one embodiment, the row bar 50 is a concatenation of about 45 thin film magnetic heads, and is about 50 mm long and about 0.3 mm thick.

Step 903 (step of polishing the air bearing surface) includes the substeps of: fixing the row bar 50 to a polishing jig 62 with wax or the like; pressing onto a polishing surface plate 60 a surface (air bearing surface) which perpendicularly intersects with the surface having the magnetic head elements 40 formed thereon; and polishing the air bearing surface while dropping a polishing liquid 64 to make the MR element height close to a predetermined value. Specifically; a target value of polishing in this step is about SH+0.03 to SH+0.15 µm where SH is the MR element height of the completed thin film magnetic head.

Then, concrete polishing conditions will be explained below. As the polishing surface plate 60, a soft metal surface plate mainly containing tin and having a rotational speed of 10 to 70 r/min is used. The oscillating speed of the polishing jig 62 in the radial direction of the polishing surface plate 60 is 20 to 60 mm/s. The polishing liquid 64 is used in order to ensure the processing efficiency and improve the surface roughness of the air bearing surface. Until the MR element height becomes around SH+0.03 to SH+0.15 µm an oily polishing liquid containing diamond grains having an average particle diameter of ½₀-½ µm is used. Then, while the MR element height is around SH+0.03 to SH+0.15 µm, dropping of the polishing liquid containing diamond grains is stopped, and then an oily polishing liquid not containing diamond grains called lubricant is dropped.

Then, in Step 904 (step of finally polishing the air bearing surface), final finish polishing of the polishing surface (air bearing surface) of the row bar 50 is performed. Step 904 (step of finally polishing the air bearing surface) includes the substeps of: achieving a predetermined MR element height SH for all magnetic head elements in the row bar 50; finishing the air bearing surface of each magnetic head element of the row bar 50 with high accuracy to a predetermined shape; and finishing the surface roughness of the air bearing surface to a predetermined value. In order to make the polishing pressure in the row bar 50 variable, the polishing device is provided with a load applicator 70 that can be deformed by a voice coil or air cylinder, and a resistance detector 72.

Figure 10:
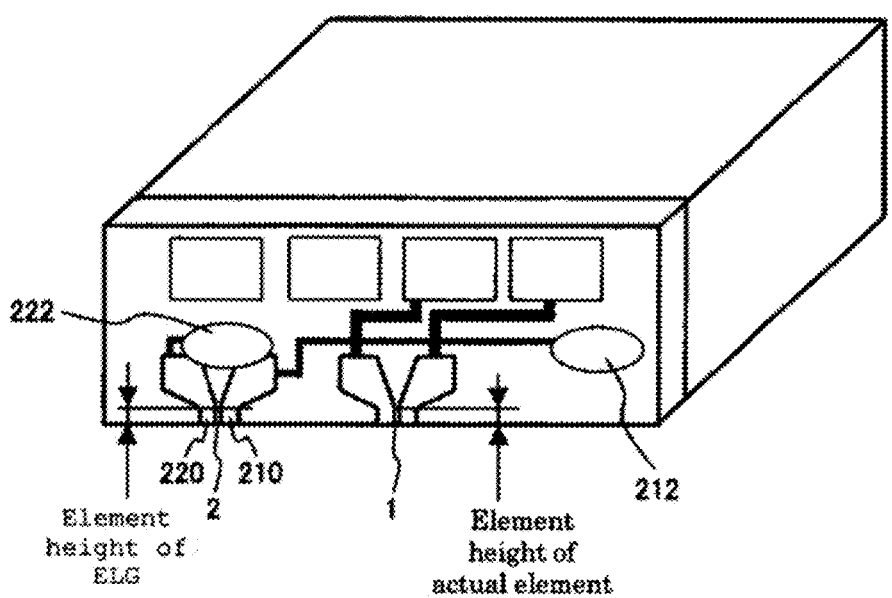
FIG. 10 shows a relation between ELG and actual element arrangements.

As shown in FIG. 10, the magnetoresistive element (actual, element) 1 and the resistance detection element (ELG) 2 are formed in the vicinity of each other for each thin film magnetic head in the row bar 50. The ELG 2 is a thin film resistive element pattern having the same laminar configuration as the magnetoresistive film 5. The ELG 2 is formed on the same plane as the magnetoresistive film 5. Lead wires 210 and 220 are connected to both ends of the ELG 2 to allow monitoring of the resistance of the ELG 2. The ELG 2 has the CIP structure with which a sense current is sent in parallel with the stacking surface of the resistance detection element. Since resistance measurement is therefore slightly affected by smear in Step 903 (step of polishing the air bearing surface) and Step 904 (step of finally polishing the air bearing surface), it is possible to accurately detect (measure) the resistance that changes as polishing progresses. When a correlation is given between the element height of the magnetoresistive element (actual element) 1 and the element height of the ELG 2, the element height of the actual element 1 can be obtained from the element height of the ELG 2 obtained from the resistance thereof.

Figure 11:
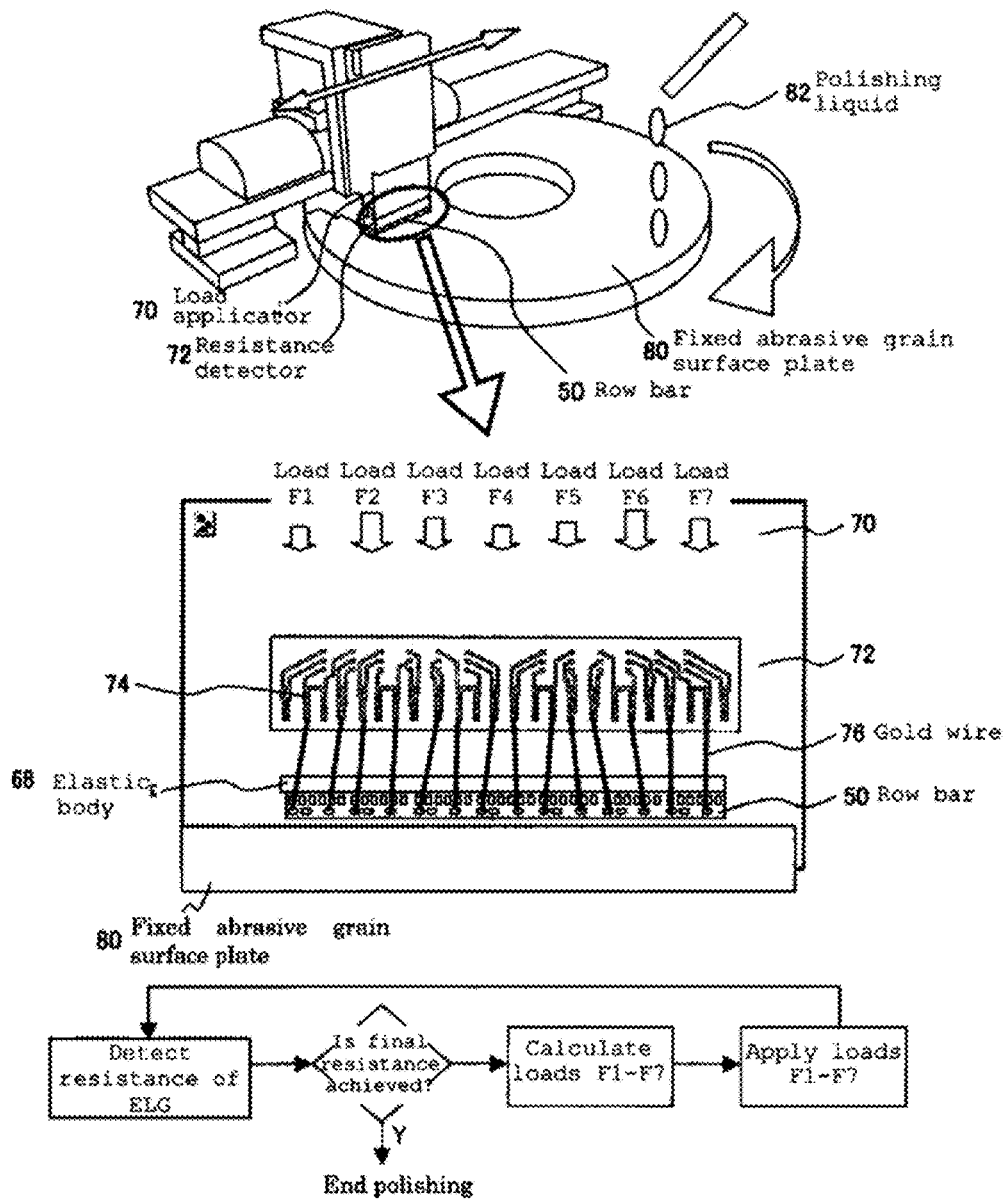
FIG. 11 explains in detail the step of polishing the air bearing surface shown in FIG. 9.

Specifically, as shown in FIG. 11, the row bar 50 is stuck on the load applicator 70 of the polishing device through an elastic element 68, and lead terminals 212 and 222 of, for example, seven ELGs 2 (refer to FIG. 10) of the row bar 50 may be connected to terminals 74 of the resistance detector 72 through gold wires 76. Then, the load applicator 70 presses the row bar 50 onto a fixed abrasive grain surface plate 80 having a predetermined (planar, spherical, or cylindrical) surface shape with a predetermined force. Then, the fixed abrasive grain surface plate 80 is rotated and at the same time the load applicator 70 is oscillated in the radius direction of the fixed abrasive grain surface plate 80 to polish the row bar 50. While the row bar 50 is being polished, the resistance of the seven ELGs 2 is monitored to control applied loads F1 to F7 in the row bar 50. When the average resistance of the seven ELGs 2 reaches the final resistance, polishing is completed. Although it is necessary to connect the lead terminals of the actual elements 1 to the terminals 74 of the resistance detector 72 in order to measure the resistance of actual elements 1, connections are omitted in FIG. 11. Actual wiring connections are shown in FIGS. 6(a) and 6(b), and will be mentioned later. A polishing surface plate made of a tin alloy with embedded fine diamond grains having a size of ½₀ to ½ µm is used as the fixed abrasive grain surface plate 80. While the row bar 50 is being polished, the fixed abrasive grain surface plate 80 is rotated, for example, at 10 r/min and the load applicator 70 oscillated at 50 mm/s while dropping a conductive polishing liquid 82 not containing diamond grains on the fixed abrasive grain surface plate 80. Further, although the resistance of the seven ELGs 2 of the row bar is measured in the present embodiment, the number of ELGs 2 is not limited thereto. The number of ELGs 2 and measurement portions can be changed as required as long as the MR element height of each magnetic head element in the row bar can be controlled within a predetermined numerical range.

Referring to FIG. 9 again, after completion of Step 904 (step of finally polishing the air bearing surface), the air bearing rails 22, the shallow groove rails 24, and the deep groove 26 are formed on the air bearing surface through dry processing such as ion milling. Reactive Ion Etching (RIE), etc., in Step 905. Specifically, Step 905 includes the substeps of: fixing the row bar 50 to a rail formation jig by using a thermoplastic adhesive tape; coating resist to the air bearing surface for exposure and development; removing non-rail portions through the abovementioned dry processing; and stripping residual resist on the air bearing surface. Then, the process from resist coating to resist stripping is repeated twice to form two level rails.

In Step 906 (step of cutting a row bar), the row bar 50 is cut with a dicing cutter or wire saw or some other cutting method to form each thin film magnetic head 10.

A method for correcting variation in offset between the ELG 2 and the actual element, (magnetoresistive element) 1 on the substrate will be explained below. As mentioned earlier, with the decrease in size of read elements, it becomes difficult to ignore variation in offset between the ELG 2 and the actual element (magnetoresistive element) 1 on the substrate, for example, when both the track width and the element height become 100 nm or below. Variation in offset between the ELG 2 and the actual element 1 is produced by formation error of an exposure mask used for forming magnetoresistive elements 1 and ELGs 2 on the substrate as well as exposure error in the exposure process.

Figure 13:
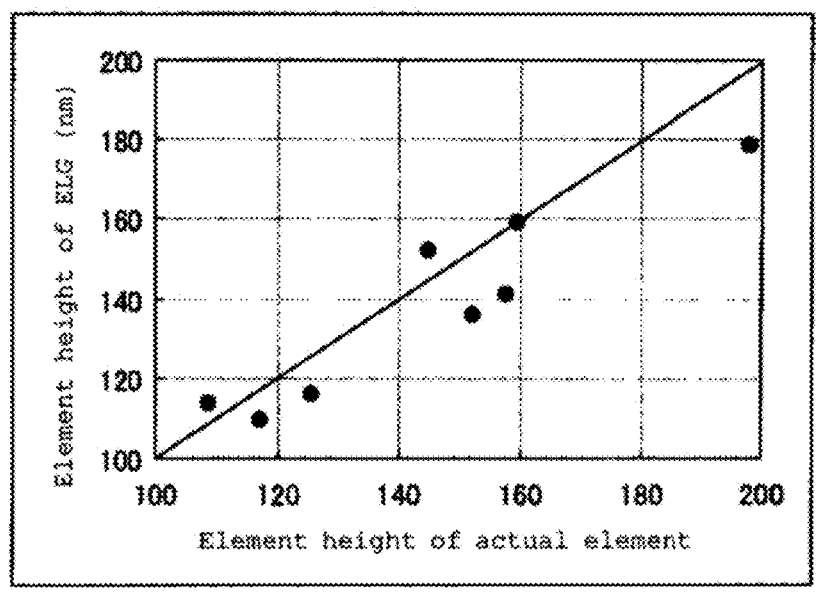
FIG. 13 shows a relation between the element height of actual elements and the element height of ELGs when the element size is decreased.

In Step 901 (step of forming elements) of FIG. 9, magnetic head elements are formed on the substrate so that values of the initial element height of ELGs 2 are 10.2 μm, 2.2 μm, and 1.2 μm, as shown in FIG. 12, according to one embodiment. This configuration makes it possible to calculate correlation between the resistance and the element height of ELGs 2 by measuring the resistance of ELGs 2 having each value of the initial element height. However, while the air bearing surface of the row bar sliced out from the substrate is being polished, favorable correlation is not obtained between the element height of the actual element 1 and the element height of the ELG 2, as shown in FIG. 13. This problem is caused by variation in offset between the ELG 2 and the actual element 1 (magnetoresistive element) 1.

Figure 2:
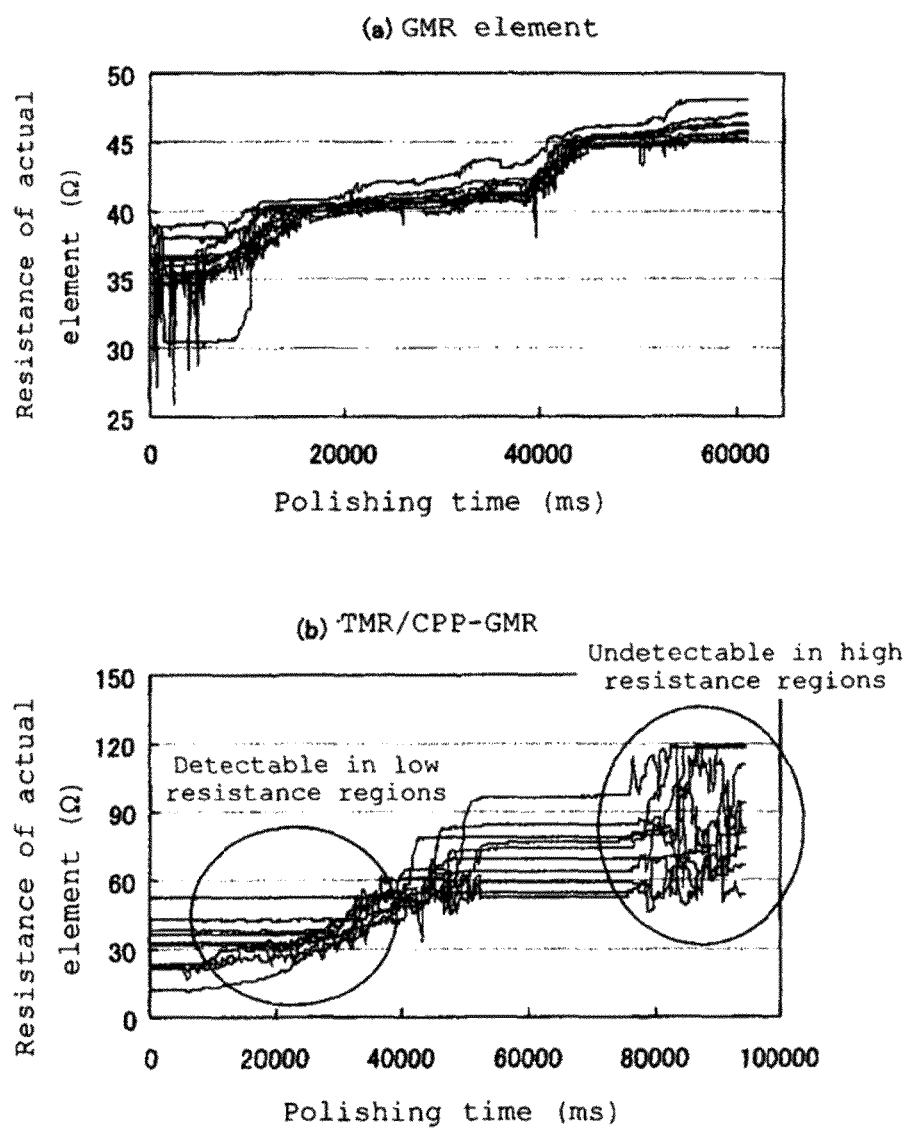
FIG. 2(a) shows resistance variation of GMR elements with respect to the polishing time.
FIG. 2(b) shows resistance variation off TMR and CPP-GMR elements with respect to the polishing time.

Therefore, in the present embodiment, Step 904 (step of finally polishing the air bearing surface) in a method for manufacturing a thin film magnetic head explained above with reference to FIG. 9 calculates the offset between the ELG 2 and the actual element (magnetoresistive element) 1 and then calculates (corrects) the final resistance of the ELG 2 by using the offset value. Processing for correcting the final resistance of the ELG 2 will be explained in detail below with reference to FIG. 1. First of all, in Step 100, the resistance of ELGs 2 and the resistance of actual elements 1 are detected (measured) in a region where the resistance of actual elements 1 currently being subjected to final polishing of air bearing surface can be detected. The region where the resistance of actual elements 1 can be detected will be explained below with reference to FIG. 2. Resistance variation with respect to the polishing time of a CIP-GMR element is shown in FIG. 2(*a*), the resistance can be detected in almost all polishing regions. However, in the case of TMR and CPP-GMR elements, the resistance can be detected in low resistance regions but not in high resistance regions because of smear effects, as shown in FIG. 2(*b*). When the polishing stage is divided into the initial, middle, and last substages, the resistance can be detected in the initial substage. In the present embodiment, therefore, the resistance of ELGs 2 and the resistance of actual elements 1 are detected (measured) in a region where the resistance of actual elements 1 can be detected, as shown in FIG. 1. The bottom of FIG. 1 is an enlarged graph of the polishing time up to 50,000 ms of FIG. 2(*b*). Then, in Step 102, the offset between the ELG 2 and the actual element 1 is calculated from the resistance of the ELG 2 and the resistance of the actual element 1 detected in Step 100. Then, in Step 104, the final resistance of the ELG 2 to be used as a target value for stopping polishing is corrected by using the calculated offset value, and the final resistance is recognized as the final target value.

Figure 3:
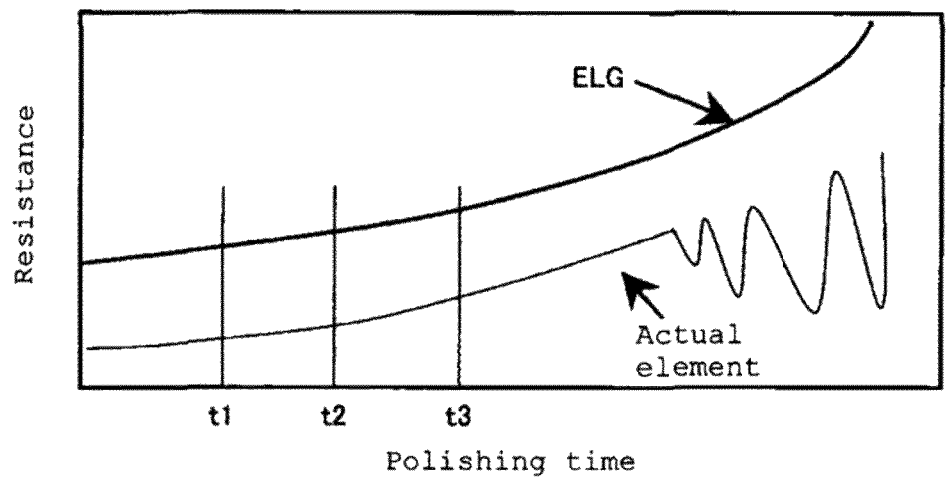
FIG. 3 shows points at which the resistance of the ELG and the resistance of the actual element are detected.

Then, processing for calculating the offset between the ELG 2 and the actual element 1 from the resistance of the ELG 2 and the resistance of the actual element 1, respectively, will be explained below with reference to FIG. 3. The horizontal axis of FIG. 3 is assigned the polishing time, and the vertical axis the resistance of the ELG 2 and the resistance of the actual element 1. The resistance of the ELG 2 and the resistance of the actual element 1 are detected (measured) at three different polishing time points t1, t2, and t3 in a region where the resistance of the actual elements 1 can be detected, and the offset between the ELG 2 and the actual element 1 is calculated as follows: the offset between the ELG 2 and the actual element 1 is σ. At the polishing time points t1, t2 and t3, the resistance of the ELG is r1, r2 and r3, the resistance of the actual element is R1, R2 and R3, and the actual element SH is SH1, SH2 and SH3, respectively. In this case, there is the following relation:

Resistance of ELG=*a*/Element height of the ELG+*b*,

Therefore, the resistance of the ELG can be represented by the following Equations 1, 2, 3;

$$r1 = a/(SH1+\sigma) + b \quad \text{Equation 1}$$

$$r2 = a/(SH2+\sigma) + b \quad \text{Equation 2}$$

$$r3 = a/(SH3+\sigma) + b \quad \text{Equation 3}$$

where a and b denote the coefficients calculated by measuring the resistance of the ELG having three different element heights in the substrate (wafer) state, as shown in FIG. 12. The resistance of the actual element can be represented by the following Equations 4, 5, 6:

$$R1 = RA/Twr/SH1 + \alpha \quad \text{Equation 4}$$

$$R2 = RA/Twr/SH2 + \alpha \quad \text{Equation 5}$$

$$R3 = RA/Twr/SH3 + \alpha \quad \text{Equation 6}$$

where RA denotes the area resistance of the actual element, Twr the track width of the actual element, and a the wiring resistance. By solving the above-mentioned simultaneous Equations 1 to 6, the offset a between the ELG 2 and the actual element 1 can be obtained by the following Equation 7:

$$\sigma = \frac{A2 \cdot R2 \cdot (A1-A3) - A1 \cdot R1 \cdot (A2-A3) - A3 \cdot R3 \cdot (A1-A2)}{R2 \cdot (A1-A3) - R1 \cdot (A2-A3) - R3 \cdot (A1-A2)} \quad \text{Equation 7}$$

where A1=a/(r1−b), A2=a/(r2−b) and A3=a/(r3−b).

Figure 4:
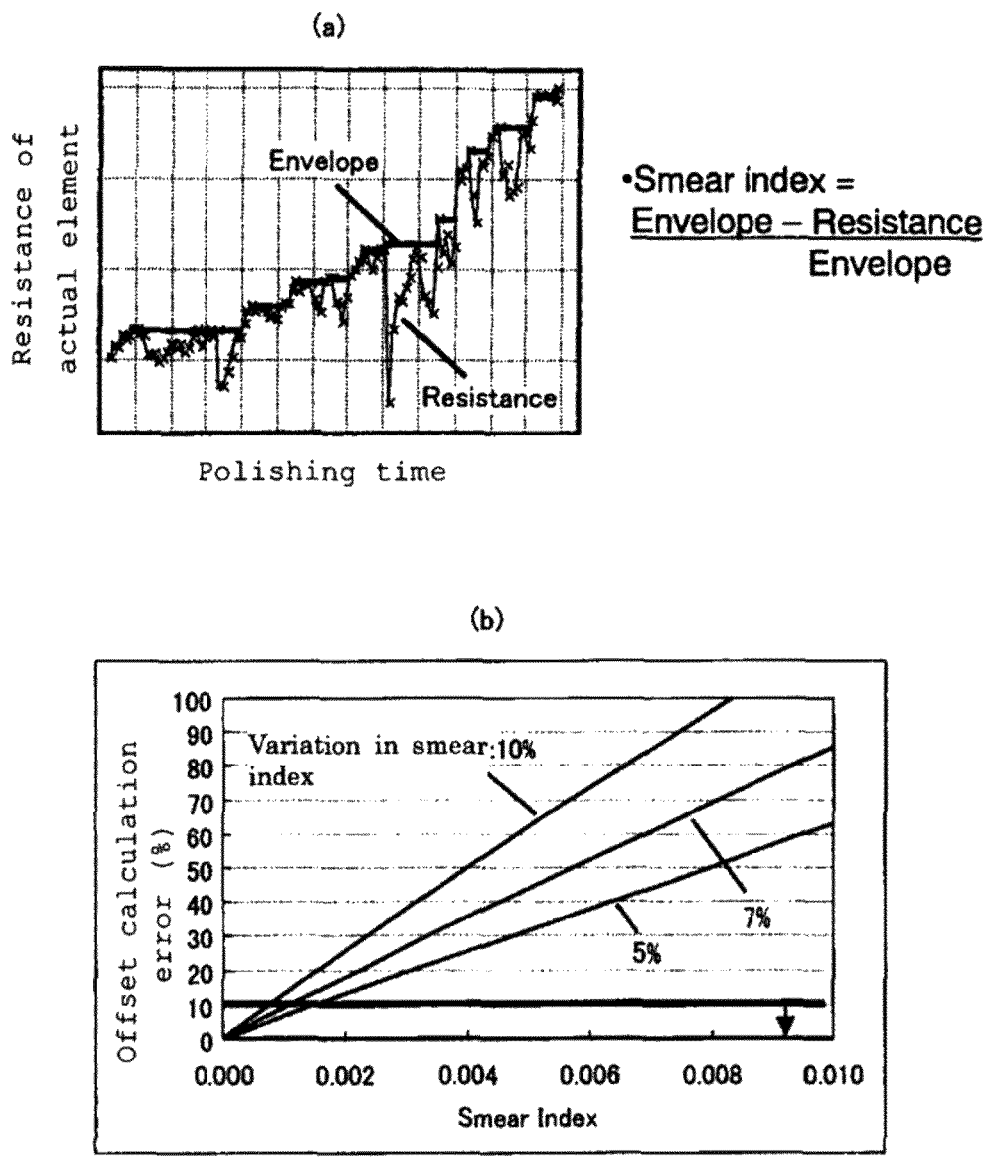
FIG. 4(a) shows a relation between the polishing time and the resistance of the actual element.
FIG. 4(b) shows a relation between the smear index and offset calculation error.

The following description explains a method for setting time points t1, t2, and t3 at which the resistance of the ELG 2 and the resistance of the actual element 1 shown in FIG. 3 are detected. FIG. 4(*a*) shows a relation between the polishing time, the resistance of the actual element 1, and the resistance envelope thereof. Here, the smear index can be represented by formula Smear index=(Envelope−Resistance)/Envelope. FIG. 4(*a*) illustrates that it is preferable to set the resistance detection points t1, t2, and t3 in a region having a flat resistance envelope of the actual element. FIG. 4(*b*) shows a relation between the smear index and offset calculation error. In order to control the offset calculation error to 10% or below, it is necessary that the smear index is 0.001 or below and variation in smear index is 7% or below after performing measurement three times.

Figure 5:
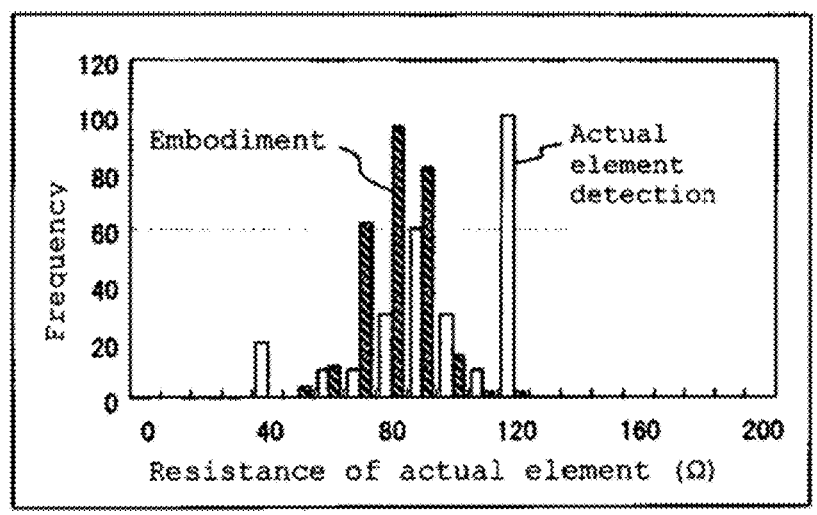
FIG. 5 shows the resistance distribution of actual elements measured in a region where the resistance of actual elements according to the present embodiment can be detected, and the resistance distribution of actual elements when the resistance of actual elements is measured without determining any region under measurement.

FIG. 5 shows the resistance distribution of actual elements measured in a region where the resistance of actual elements according to the present embodiment can be detected, and the resistance distribution thereof when the resistance of actual elements is measured without determining any region under measurement. In the present embodiment, since there is little variation, in resistance of the actual, element, the offset σ between the ELG 2 and the actual element 1 can be accurately calculated.

Although the resistance of the actual element 1 is measured at three polishing time points (t1, t2, and t3) in the above-mentioned embodiment, this number of time points is given as an example and may be changed to any values. Further, although the coefficients a and b shown in FIG. 12 are calculated by measuring the resistance of the ELG having the three different element heights in the substrate (wafer) state, this number of element heights is not limited thereto but may be changed to any values.

Figure 6:
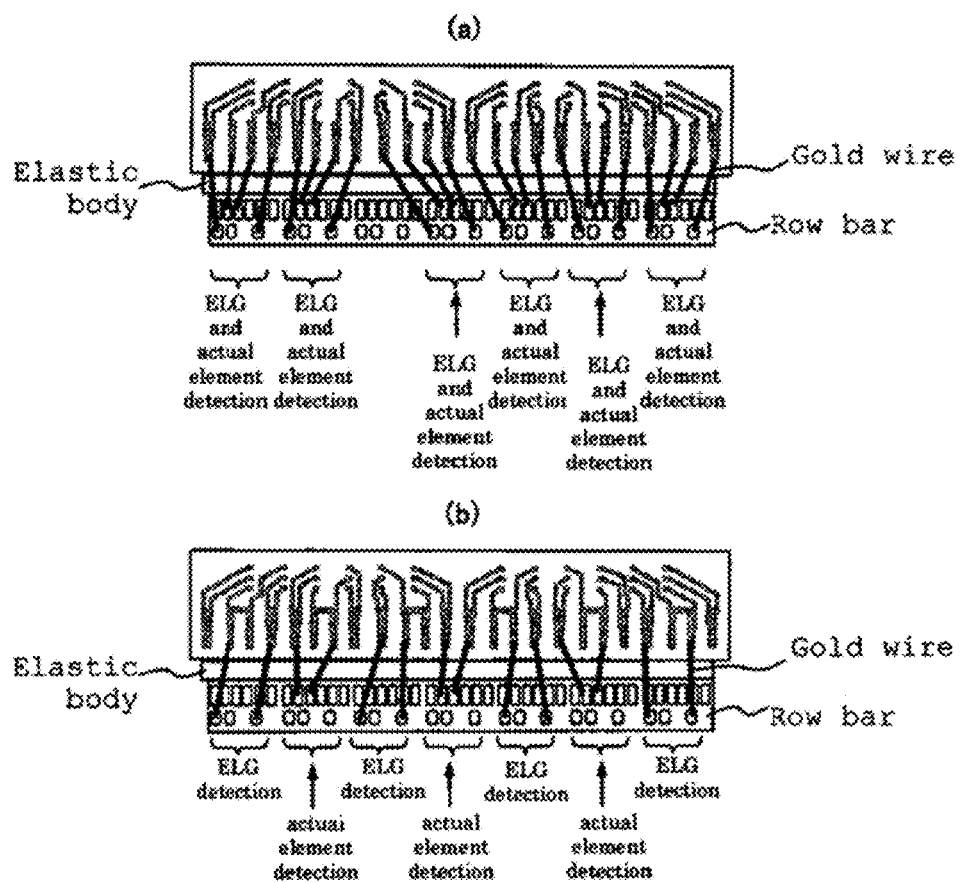
FIG. 6(a) shows an example of connections between lead terminals of ELGs and actual elements in a row bar and lead terminals of a resistance detector.
FIG. 6(b) shows another example of connections therebetween.

FIG. 6(*a*) shows an example of actual connections between the lead terminals of the ELGs 2 and the actual elements 1 in the row bar and the lead terminals 74 of the resistance detector 72 shown in FIG. 11. In this example, the lead terminals of the ELGs 2 and the actual elements 1 in each thin film magnetic head are connected to the lead terminals 74 of the resistance detector 72 through gold wires 76. FIG. 6(*b*) shows another example of connections. With one thin film magnetic head of the concatenation of thin film magnetic heads, the lead terminals of an ELG 2 are connected to the lead terminals 74 of the resistance detector 72. With a thin film magnetic head adjacent to the above-mentioned one, the lead terminals of an actual element 1 are connected to the lead terminals 74 of the resistance detector 72. In this way, the lead terminals of ELGs 2 and the lead terminals of actual elements 1 are connected to the lead terminals 74 of the resistance detector 72 in alternation for every other thin film magnetic head.

The following list is a description of the reference numerals and signs, and is provided for quick reference to the references consistent throughout the various figures included herein:

1: Magnetoresistive element with CPP structure
 2: Resistance detection element (ELG)
 3: Upper magnetic shield and electrode layer
 4: Lower magnetic shield and electrode layer
 5: Magnetoresistive film
 10: Thin film magnetic head
 11; free layer
 12: intermediate layer
 13: Pinned layer
 14: Antiferromagnetic layer
 15: Refill film
 16: Magnetic domain control layer
 20; Slider
 22: Air bearing rail
 24: Shallow groove rail
 26: Deep groove
 28: Insulating film
 30; Element formation portion
 32: Separation layer
 34: Protective layer
 40: Magnetic head element
 42: write element
 44: Lower magnetic film
 46: Coil
 48: Upper magnetic film
 50: Row bar
 70: Load applicator
 72: Resistance detector
 80: Fixed abrasive grain surface plate
 82: Polishing liquid
 210, 220: Lead wire
 212, 222: Lead terminal While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method for manufacturing a thin film magnetic head, the method comprising:
 forming, on a substrate, a plurality of magnetic head portions, each magnetic head portion having a magnetoresistive element and at least one resistance detection element for measuring an amount of polishing;
 slicing the substrate to form at least one row bar;
 polishing an air bearing surface of the at least one row bar;
 forming rails on the polished air bearing surface; and
 cutting the at least one row bar to separate each of the plurality of magnetic head portions,
 wherein the polishing the air bearing surface of the at least one row bar further includes:
  measuring a resistance of each of the plurality of resistance detection elements and a resistance of each magnetoresistive element;
  calculating an offset value between the resistance of each of the plurality of detection elements and the resistance of each of the magnetoresistive elements from the measured resistance of each of the plurality of resistance detection elements and the measured resistance of each magnetoresistive element;
  correcting a predetermined final resistance of the resistance detection element using the calculated offset value; and
  terminating the polishing when the resistance of the resistance detection element reaches the corrected final resistance.

2. The method for manufacturing a thin film magnetic head according to claim 1, wherein the calculating the offset value between the resistance of each of the plurality of detection elements and the resistance of each of the magnetoresistive elements is performed in a polishing stage where the resistance of each of the magnetoresistive elements can be measured.

3. The method for manufacturing a thin film magnetic head according to claim 2, wherein the polishing stage where the resistance of each of the magnetoresistive elements can be measured refers to a polishing stage where the resistance of at least one of the magnetoresistive elements is low.

4. The method for manufacturing a thin film magnetic head according to claim 2, wherein when the polishing stage is divided into initial, middle, and last substages, the polishing stage where the resistance of each of the magnetoresistive elements can be measured refers to the initial substage.

5. The method for manufacturing a thin film magnetic head according to claim 1, wherein the polishing the air bearing surface of the at least one row bar includes:
 approximating an element height of the magnetoresistive element to a predetermined element height value;
 achieving the predetermined element height value of the magnetoresistive element; and
 finishing a surface roughness of a surface to be polished to a predetermined value.

6. The method for manufacturing a thin film magnetic head according to claim 1, wherein the magnetoresistive element is a tunneling magnetoresistive (TMR) element.

7. The method for manufacturing a thin film magnetic head according to claim 1, wherein the magnetoresistive element is a CPP-GMR element.

8. A method for manufacturing a thin film magnetic head, the method comprising:
 forming, on a substrate, a plurality of magnetic head portions, each magnetic head portion having a magnetoresistive element and at least one resistance detection element for measuring an amount of polishing;
 slicing the substrate to form at least one row bar;
 polishing an air hearing surface of the at least one row bar;
 forming rails on the polished air hearing surface; and
 cutting the at least one row bar to separate each of the plurality of magnetic head portions, wherein the polishing the air bearing surface of the at least one row bar further includes:
measuring a resistance of each of the plurality of resistance detection elements and a resistance of each magnetoresistive element;
calculating an offset value between the resistance of each of the plurality of detection elements and the resistance of each of the magnetoresistive elements from the measured resistance of each of the plurality of resistance detection elements and the measured resistance of each magnetoresistive element; and
calculating a final resistance of the resistance detection element by using the calculated offset value,
wherein when the resistance of the resistance detection element reaches the final resistance, polishing of the air bearing surface of the at least one row bar is terminated,
wherein the measuring the resistance of each of the plurality of resistance detection elements and the resistance of each magnetoresistive element is performed in a region where the difference between a resistance envelope and the resistance of each of the magnetoresistive elements is small.

9. The method for manufacturing a thin film magnetic head according to claim 8, wherein the calculating the offset value between the resistance of each of the plurality of detection elements and the resistance of each of the magnetoresistive elements is performed in a polishing stage where the resistance of each of the magnetoresistive elements can be measured.

10. The method for manufacturing a thin film magnetic head according to claim 9, wherein the polishing stage where the resistance of each of the magnetoresistive elements can be measured refers to a polishing stage where the resistance of at least one of the magnetoresistive elements is low.

11. The method for manufacturing a thin film magnetic head according to claim 9, wherein when the polishing stage is divided into initial, middle, and last substages, the polishing stage where the resistance of each of the magnetoresistive elements can be measured refers to the initial substage.

12. The method for manufacturing a thin film magnetic head according to claim 8, wherein the magnetoresistive element is a tunneling magnetoresistive (TMR) element.

13. The method for manufacturing a thin film magnetic head according to claim 8, wherein the magnetoresistive element is a CPP-GMR element.

14. A method for manufacturing a thin film magnetic head, the method comprising:
forming, on a substrate, a plurality of magnetic head portions, each magnetic head portion having a magnetoresistive element and at least one resistance detection element for measuring an amount of polishing;
slicing the substrate to form at least one row bar; and
polishing an air bearing surface of the at least one row bar, wherein the polishing the air bearing surface of the at least one row bar further includes:
measuring a resistance of one of the resistance detection elements during a final stage of the polishing;
measuring a resistance of the magnetoresistive element of the head portion having the resistance detection element being measured during the final stage of the polishing;
calculating an offset value between the measured resistances; and
calculating a final resistance value of the resistance detection element using the calculated offset value;
monitoring the resistance of the resistance detection element for determining when the resistance thereof reaches the calculated final resistance value; and
terminating the polishing when the resistance of the resistance detection element reaches the final resistance value.

15. The method for manufacturing a thin film magnetic head according to claim 14, wherein the measuring the resistance of the resistance detection element and the resistance of the magnetoresistive element is performed in a region where the difference between a resistance envelope and the resistance of the magnetoresistive element is small.

16. The method for manufacturing a thin film magnetic head according to claim 14, wherein the magnetoresistive element is a tunneling magnetoresistive (TMR) element.

17. The method for manufacturing a thin film magnetic head according to claim 14, wherein the magnetoresistive element is a CPP-GMR element.

18. The method for manufacturing a thin film magnetic head according to claim 14, wherein the polishing the air bearing surface of the at least one row bar includes:
approximating an element height of the magnetoresistive element to a predetermined element height value;
achieving the predetermined element height value of the magnetoresistive element; and
finishing a surface roughness of a surface to be polished to a predetermined value.

* * * * *

UNITED STATES PATENT AND TRADEMARK OFFICE
CERTIFICATE OF CORRECTION

PATENT NO. : 8,407,882 B2
APPLICATION NO. : 12/559327
DATED : April 2, 2013
INVENTOR(S) : Seki et al.

It is certified that error appears in the above-identified patent and that said Letters Patent is hereby corrected as shown below:

In the specification:

col. 1, line 8 replace "Is" with --is--;

col. 2, line 51 replace "off" with --of--;

col. 5, lines 46-47 replace "anriferromagnetic" with --antiferromagnetic--;

col. 6, line 15 replace "wail" with --wall--;

col. 6, line 41 replace "Co," with --Cu,--;

col. 6, line 53 replace "anriferromagnetic" with --antiferromagnetic--.

In the claims:

col. 12, line 64 replace "hearing" with --bearing--;

col. 12, line 65 replace "hearing" with --bearing--;

col. 13, line 17 replace "hearing" with --bearing--.

Signed and Sealed this
Fourth Day of June, 2013

Teresa Stanek Rea
*Acting Director of the United States Patent and Trademark Office*